United States Patent [19]

Honan et al.

[11] Patent Number: 5,348,158

[45] Date of Patent: Sep. 20, 1994

[54] DISPENSER PACK FOR THE SUCCESSIVE DISPENSING OF A DRUG

[75] Inventors: David G. Honan, Somerville, Mass.; Gregory W. Lantz, Wheaton, Ill.; Thomas E. Salisbury, Wayland, Mass.

[73] Assignee: G. D. Searle & Co., Chicago, Ill.

[21] Appl. No.: 810,233

[22] Filed: Dec. 19, 1991

[51] Int. Cl.⁵ .............................................. B65D 83/04
[52] U.S. Cl. ................... 206/531; 206/534.1; 206/534.2; 206/538
[58] Field of Search ...................... 206/531, 532, 534.1, 206/534.2, 538, 539; 221/87, 88, 89

[56] References Cited

U.S. PATENT DOCUMENTS

| | | | |
|---|---|---|---|
| 2,971,683 | 2/1961 | Paulsen | 226/97 |
| 3,199,489 | 8/1965 | Ruoss et al. | 116/121 |
| 3,283,885 | 11/1966 | Grunewald et al. | 206/532 |
| 3,324,996 | 6/1967 | Jordt | 206/531 |
| 3,504,788 | 4/1970 | Gray | 206/42 |
| 3,630,171 | 12/1971 | Huck | 116/121 |
| 3,678,884 | 7/1972 | Robbins | 206/539 |
| 4,384,649 | 5/1983 | Brodsky | 206/532 |
| 4,660,991 | 4/1987 | Simon | 368/10 |
| 4,778,054 | 10/1988 | Newell et al. | 206/531 |
| 4,905,866 | 3/1990 | Bartell et al. | 206/531 |
| 4,998,623 | 3/1991 | Doull | 206/532 |
| 5,082,114 | 1/1992 | Bunin | 206/539 |

FOREIGN PATENT DOCUMENTS 2919713  11/1980  Fed. Rep. of Germany ...... 206/531

Primary Examiner—David T. Fidei
Attorney, Agent, or Firm—Roger A. Williams; Paul D. Matukaitis

[57] ABSTRACT

A reusable dispensing package is provided for dispensing medication in the form of tablets, pills, capsules or the like, in a predetermined sequence, the package includes a hinged container into which is placed a disposable blister pack containing the medicament, the container having a spring-loaded button or a plunger attached thereto which is moved around the cover of the dispenser and when depressed releases a tablet or pill from the blister.

6 Claims, 2 Drawing Sheets

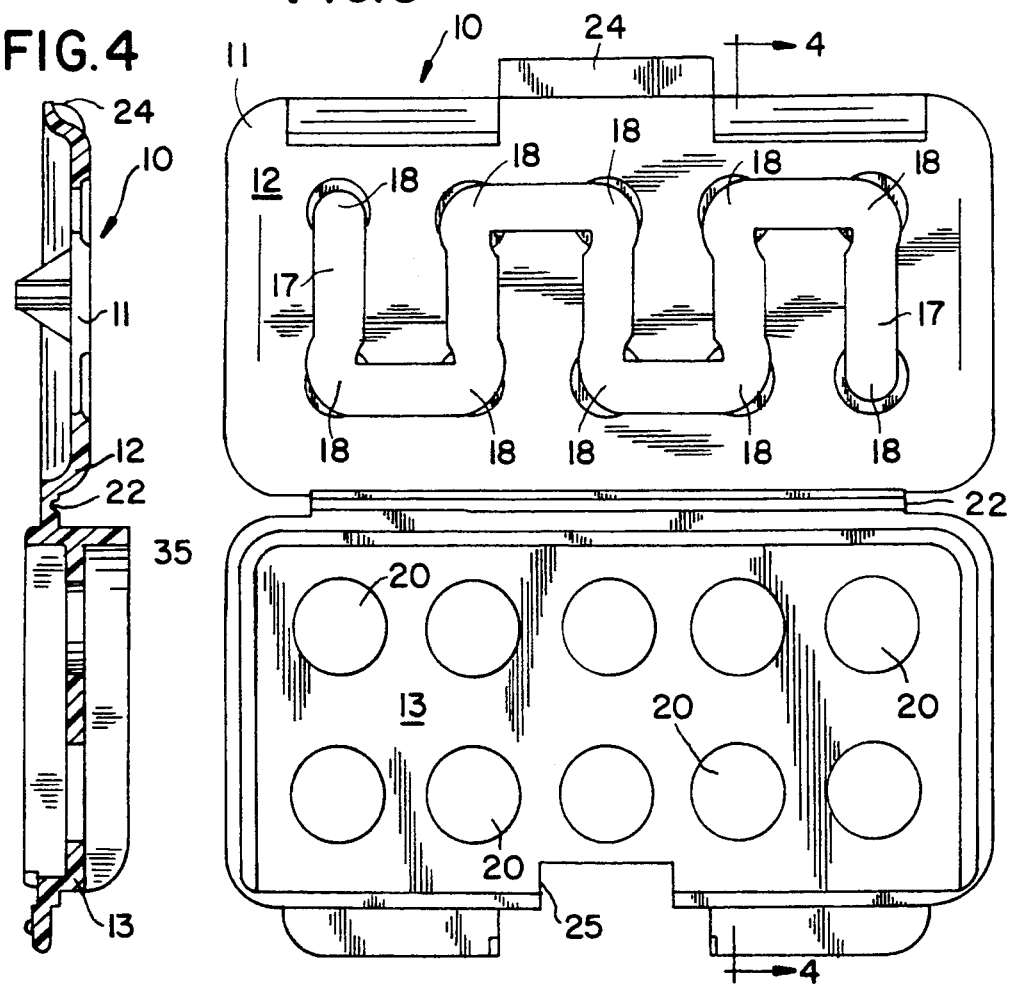
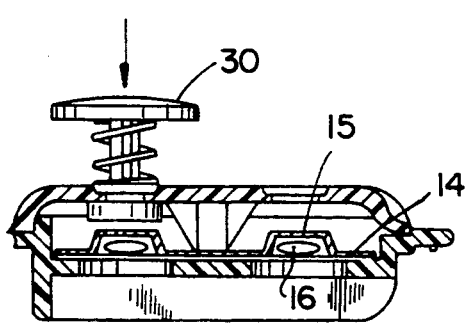
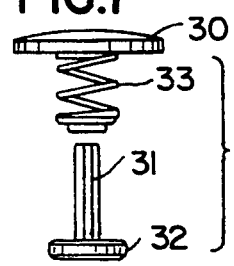
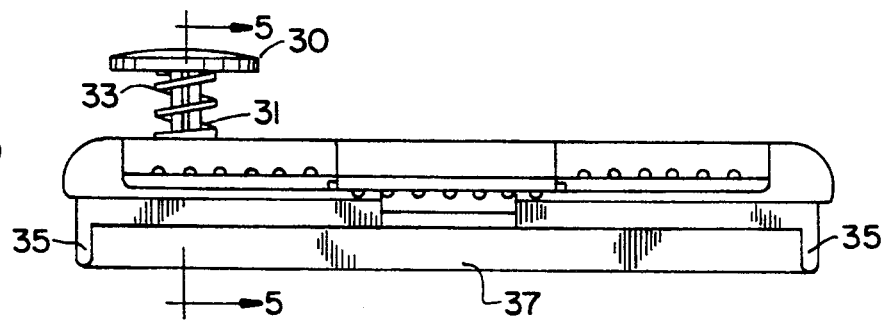

DISPENSER PACK FOR THE SUCCESSIVE DISPENSING OF A DRUG

BACKGROUND OF THE INVENTION

Medication in solid form such as tablets, pills, capsules or the like are sometimes dispensed to patients in dispensers having blister packages therein which include individually sealed blisters or compartments designed to hold a single dose of medication. Such packages permit the handling of only a single dose of medicine at a time and minimize the risk of contamination of the tablet, pill or capsule. Other dispensers do not include blister packages. Such dispensers are exemplified by various forms.

For example, U.S. Pat. No. 2,971,683, issued Feb. 14, 1961, discloses a dispenser which in one form is circular and includes a number of compartments for tablets or pills. An outlet opening or aperture is included in a portion of the dispenser and as the dispenser is rotated, a pill is dispensed through the opening as each compartment is positioned over the opening. In another form, the pills are retained in compartments which are in line in a sheet and as the sheet is moved to place the compartments in line with an outlet opening, the pills are dispensed.

U.S. Pat. No. 3,199,489, issued Aug. 10, 1965, discloses a container for medicament in the form of pills and which are to be administered at specific intervals. The pills are retained in a circular configuration and are dispensed by pressing out through an easily tearable foil.

U.S. Pat. No. 4,384,649, issued May 24, 1983, discloses a medicament dispensing package including a blister pack and cover and an outer shell wherein the blister pack has multiple pockets for receiving medicament, and the outer shell has means for sealing the cover around the pocket of the blister pack. The package is reusable and the blister pack is disposable.

U.S. Pat. No. 4,660,991, issued Apr. 28, 1987, discloses a dispenser for storing and signaling the time for taking drugs. The dispenser includes an electrical push button which acts on the blister pockets in the direction of ejection. Each blister pocket has a corresponding electrical push button.

U.S. Pat. No. 3,504,788, issued Apr. 7, 1970, discloses a three component package including a press through packet or blister pack, a tray to support the packet and an outer sheath to protect the packet and tray.

U.S. Pat. No. 3,630,171, issued Dec. 28, 1971, discloses a tablet dispenser including a parallel series of columns of tablets. The number of columns being equal to the number of medicament doses to be dispensed within a specified time period.

U.S. Pat. No. 4,905,866, issued Mar. 6, 1990, discloses a device for dispensing pills in successive order. The pills are retained in a single row in the desired successive order and a pill ejector is arranged for incremental movement in one direction along the dispenser. When the pill ejector is adjacent to a pill, a bendable member is displaced to push the pill out of a blister type package and through an opening in the rear of the dispenser.

SUMMARY OF THE INVENTION

Disclosed is a reusable dispensing package for dispensing medication in the form of tablets, pills, capsules or the like in a predetermined sequence. In one embodiment, the dispenser comprises a hinged container into which is placed a disposable blister pack containing the medicament. The cover of the dispenser includes a double "S" race which contains a spring-loaded button or plunger. The blister package includes a plurality of spaced apart blisters for containing the medication and the base portion of the dispenser includes a plurality of spaced apart openings coextensive with the blisters in the blister package. As the button is moved around the double "S" shaped race in the cover of the dispenser, at each corner, it is in line with a blister containing a drug, tablet or pill, for example. Hence, when the plunger is depressed, it releases the tablet or pill from the blister. This enables the patient to keep track of the number of tablets or pills which have been dispensed so that the proper number are taken daily, for example. Moreover, the dispenser is particularly useful for arthritic patients who have difficulty opening a tamper proof container generally used for dispensing medication. With the dispenser as described, simply pressing the plunger releases the desired tablet or pill, while at the same time, maintaining the tamper proof feature of the dispenser.

BRIEF DESCRIPTION OF THE DRAWINGS

The invention will be better understood by referring to the accompanying drawings in which:

FIG. 3 is a plan view of the opened dispenser pack when viewing the top of the cover and the outside of the base;

FIG. 4 is a cross-sectional view of a portion of the dispenser pack as viewed along the lines 4—4 of FIG. 3;

FIG. 5 is a side elevational view of the dispenser pack when in the closed position;

FIG. 6 is an end cross-sectional view as viewed along the lines 5—5 of FIG. 5 and illustrating the plunger positioned over a blister in the blister pack; and FIG. 7 is an exploded view of a spring-loaded embodiment of the plunger.

DETAILED DESCRIPTION OF THE INVENTION

The dispenser of the present invention includes a race having a plurality of intersecting tracks which, for example, can be in the shape of an "S" sawtooth, square, parallelogram, hexagon, and the like. The intersection of the tracks form a stop for the plunger as it is moved along the race, each of the intersections being in alignment with a tablet or pill retained within the dispenser. At each intersection, the plunger can be depressed to release a tablet or pill.

For purposes of description, the invention is described with reference to a dispenser including a double "S" shaped race.

Figure 1:
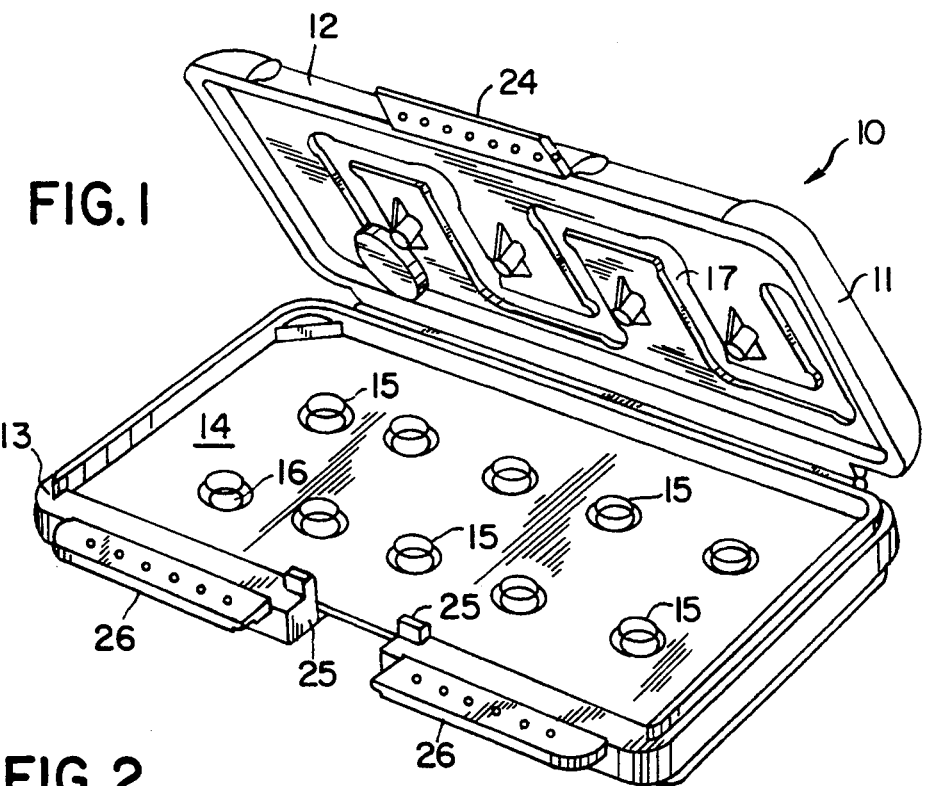
FIG. 1 is an isometric representation of an embodiment of a dispenser pack in accordance with the invention.
Figure 2:
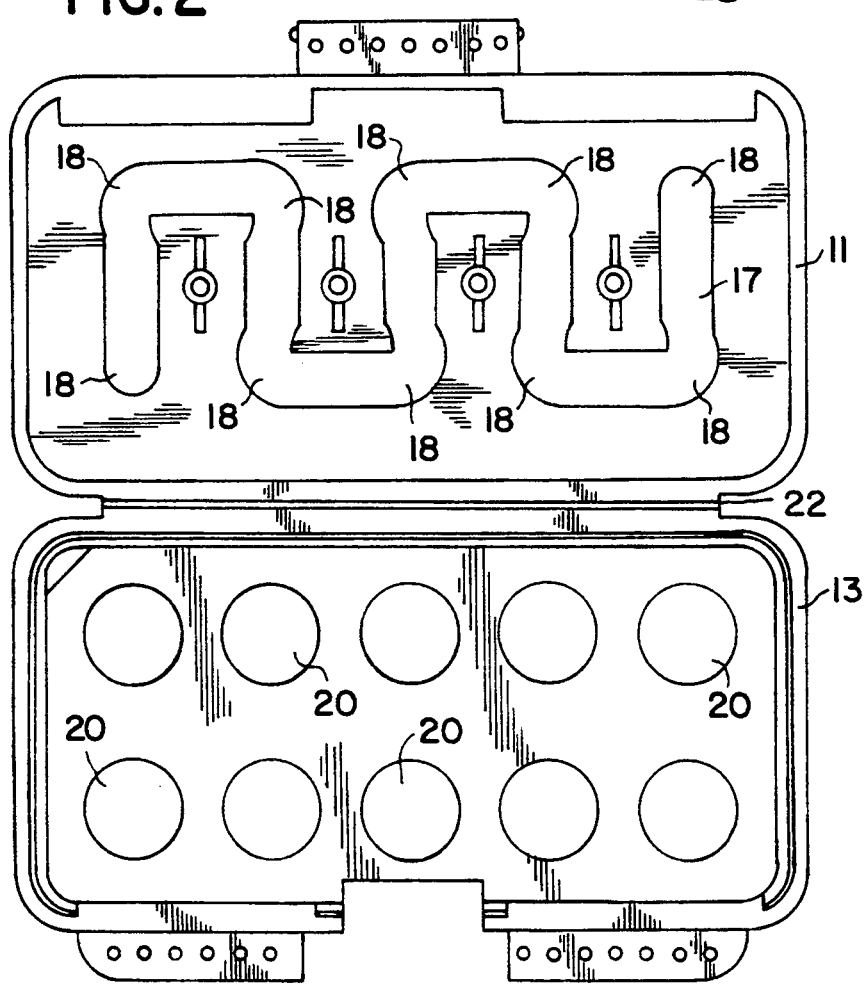
FIG. 2 is a plan view of the dispenser pack when viewing the inside of the cover and the inside of the base.

Referring to FIG. 1 an embodiment of the dispenser pack (10) of the present invention is illustrated. The dispenser pack (10) comprises a container (11) including a cover (12) and a base portion (13). Disposed within the base portion (13) is a disposable blister package (14) including a plurality of spaced apart blisters (15) for receiving and containing the medication (16). The cover (12) includes a double "S" shaped race (17) including corners (18). The base portion (13) includes a plurality of spaced apart openings (21) which are coextensive with the blisters (15) in the blister package (14) and the corners (18) in the double "S" shaped race (17) disposed within the cover (12). As illustrated, a hinge (22) joins the cover (12) and the base portion (13) but if desired the cover (12) and base portion (13) can be separate and adapted to fit together.

In the embodiment shown, the cover (12) includes a latch (24) which fits into the notch (25) of the base portion (13). The opposed latch extensions (26) in the base portion (13) allow for easier opening of the latch (24) by the user, especially a user who may be physically impaired.

The double S shaped race 17 in the cover 12 includes a defined corner 18 which has a partial radius 19 on the outside of the corner and a small partial radius 20 on the inside of the corner to form a detente. The detente receives the plunger 30 and assures that it is positioned over the tablet or pill to be dispensed.

As best illustrated in FIGS. 1 and 6, a plunger (30) is positioned within the double "S" race (17) in the cover (12) and is moveable therein. In the embodiment illustrated, the plunger (30) is biased by means of a spring (33) mounted on the shaft (31) of the plunger (30). An oversize knob 34 is illustrated in the embodiment shown. Oversizing of the knob 34 assures easy contact with a broad surface for maximum impact area by a user, and in particular, assures greater potential for impact results by an arthritic patient. In the embodiment illustrated, the base portion (13) includes a ridge (35) around the periphery thereof to form a space (37) underneath the dispenser pack (10) to receive the tablet (16) when it is released from the blister (15) in the blister package (14).

In use, when it is desired to release a tablet (16) from the dispenser pack (10), the plunger (30) is positioned at a corner (18) in the double "S" shaped race (17) in the cover (12). As the plunger (30) is depressed, the button portion (32) of the plunger (30) contacts the blister (15) in the blister package whereby the blister (15) is ruptured and the tablet (16) drops through the opening (21) in the base portion (13), dropping into the space (37) underneath the container (11) where it can be retrieved.

Although this invention has been described with respect to specific embodiments, the details of these embodiments are not to be construed as limitations. Various equivalents, changes and modifications may be made without departing from the spirit and scope of this invention, and it is understood that such equivalent embodiments are part of this invention.

What is claimed is:

1. A reusable dispensing package for dispensing medication in the form of tablets, pills, capsules in a predetermined sequence, said package comprising a reusable container having a cover and base portion, the cover being engageable with the base to form the container; the base portion being adapted to receive a blister package, the blister package including a plurality of spaced apart blisters for receiving and containing said medication, the base portion including a plurality of spaced apart openings coextensive with the blisters in the blister package;

the cover portion including a race;
   a plunger positioned in the race and moveable therein;
   the race having a plurality of intersecting tracks including intersections in substantial alignment with the spaced apart blisters in the blister package;
   the plunger being moveable successively to each intersection of the tracks in the race whereby when the plunger is depressed, the plunger releases the medicament in the blister in alignment with the intersection and the opening in the base portion.

2. The dispensing package of claim 1 wherein the cover is joined to the base by hinge means.

3. A reusable dispensing package for dispensing medication in the form of tablets, pills, capsules in a predetermined sequence, said package comprising a reusable hinged container having a cover and base portion, the cover being engageable with the base to form the container; the base portion being adapted to receive a blister package, the blister package including a plurality of spaced apart blisters for receiving and containing said medication, the base portion including a plurality of spaced apart openings coextensive with the blisters in the blister package;

the cover portion including an S shaped race;
   a plunger positioned in the race and moveable therein;
   the S shaped race including corners in substantial alignment with the spaced apart blisters in the blister package;
   the plunger being moveable successively to each corner in the race whereby when the plunger is depressed, the plunger releases the medicament in the blister in alignment with the corner and the opening in the base portion.

4. The dispensing package of claim 3 wherein the cover is joined to the base by hinge means.

5. The dispensing package of claim 3 wherein the corners in the S shaped race include a partial radius on the outside of the corner and a smaller partial radius on the inside of the corner to form a detente for receiving the plunger.

6. The dispensing package of claim 3 including a double S shaped race.

* * * * *